United States Patent
Staub et al.

(10) Patent No.: US 11,153,730 B2
(45) Date of Patent: Oct. 19, 2021

(54) SYSTEMS AND METHODS FOR OBTAINING DATA FROM MACHINES DISCONNECTED FROM A NETWORK

(71) Applicant: Caterpillar Inc., Deerfield, IL (US)

(72) Inventors: Michael D. Staub, Metamora, IL (US); Jeremy J. Wilson, Peoria, IL (US)

(73) Assignee: Caterpillar Inc., Peoria, IL (US)

(*) Notice: Subject to any disclaimer, the term of this patent is extended or adjusted under 35 U.S.C. 154(b) by 353 days.

(21) Appl. No.: 16/263,670

(22) Filed: Jan. 31, 2019

(65) Prior Publication Data

US 2020/0252768 A1   Aug. 6, 2020

(51) Int. Cl.
| | |
|---|---|
| *H04W 4/40* | (2018.01) |
| *H04W 76/14* | (2018.01) |
| *H04W 8/00* | (2009.01) |
| *H04W 4/029* | (2018.01) |
| *H04W 4/80* | (2018.01) |
| *H04W 84/18* | (2009.01) |

(52) U.S. Cl.
CPC ............ *H04W 4/40* (2018.02); *H04W 4/029* (2018.02); *H04W 4/80* (2018.02); *H04W 8/005* (2013.01); *H04W 76/14* (2018.02); *H04W 84/18* (2013.01)

(58) Field of Classification Search
CPC ....... H04W 4/40; H04W 4/029; H04W 76/14; H04W 4/80; H04W 8/005; H04W 84/18
See application file for complete search history.

(56) References Cited

U.S. PATENT DOCUMENTS

| | | | | |
|---|---|---|---|---|
| 7,373,108 | B2 | 5/2008 | Vidaillac | |
| 7,987,027 | B2* | 7/2011 | Greiner | E02F 9/26 |
| | | | | 701/31.4 |
| 8,195,231 | B2* | 6/2012 | Ring | G07C 5/008 |
| | | | | 455/557 |
| 9,467,862 | B2 | 10/2016 | Zeiler et al. | |
| 9,938,693 | B1 | 4/2018 | Caterpillar | |
| 10,475,341 | B1* | 11/2019 | Beaudry | G08G 1/0116 |
| 2007/0168091 | A1* | 7/2007 | Huang | H03J 1/0025 |
| | | | | 701/36 |
| 2015/0337522 | A1 | 11/2015 | Caterpillar | |
| 2017/0086054 | A1* | 3/2017 | Azevedo | H04W 40/00 |
| 2017/0261450 | A1 | 9/2017 | Modustri | |
| 2018/0159693 | A1* | 6/2018 | Condeixa | H04L 9/3268 |

* cited by examiner

*Primary Examiner* — Chi H Pham
*Assistant Examiner* — Weibin Huang
(74) *Attorney, Agent, or Firm* — Bookoff McAndrews PLLC

(57) ABSTRACT

A system for collecting data from a machine lacking network connectivity may comprise a mobile vehicle. The mobile vehicle may be configured for providing a vehicle communication network to a data hauling device of the machine, the machine being remote from a stationary site having a site-specific communication network. The mobile vehicle may further be configured for retrieving data from the data hauling device via the vehicle communication network, detecting the site-specific communication network, and uploading the retrieved data to the stationary site using the site-specific communication network.

15 Claims, 3 Drawing Sheets

SYSTEMS AND METHODS FOR OBTAINING DATA FROM MACHINES DISCONNECTED FROM A NETWORK

TECHNICAL FIELD

The present disclosure relates generally to a data collection system. More particularly, the present disclosure relates to a systems and methods for obtaining data from machines disconnected from a network.

BACKGROUND

Machines that operate at work sites may collect, track, and analyze data, including machine location, operator actions/efficiency, productivity, refueling or maintenance needs, operating status, etc. Machine owners or users may use the data collected to (1) manage machine operation, productivity, and maintenance, and/or (2) keep track of a fleet of machines. The data collected by each machine may be relayed to machine owners or users, e.g., at a back office or back office network situated remotely from the work site. Currently, machines may convey the data via cellular or satellite networks. However, some work site locations do not have access to reliable cellular networks, and satellite network data plans are often expensive. Accordingly, a desire exists for a way for the back office to obtain machine data without using an unreliable/unavailable cellular network or an expensive satellite network.

U.S. Pat. No. 9,938,693 (the '693 patent), to Reed et al. describes a tracking device mounted on a work tool and configured to transmit a work tool identification signal, and a scanning device configured to detect the work tool identification signal when the scanning device is in the vicinity of the tracking device. The '693 patent describes the work tool identification signal as being transmitted through a wireless communication network such as, a Bluetooth® network, a near-field communication network, a radio frequency communication network, a computer data network, a Wi-Fi data network, a cellular data network, or a satellite data network. The system of the '693 patent, however, does not describe how the identification signal is transmitted in a scenario where the work tools are disconnected from the network. The system of the present disclosure may solve one or more of the problems set forth above and/or other problems in the art. The scope of the current disclosure, however, is defined by the attached claims, and not by the ability to solve any specific problem.

SUMMARY

In one aspect, a system for collecting data from a machine lacking network connectivity may comprise a mobile vehicle. The mobile vehicle may be configured for providing a vehicle communication network to a data hauling device of the machine, the machine being remote from a stationary site having a site-specific communication network. The mobile vehicle may further be configured for retrieving data from the data hauling device via the vehicle communication network, detecting the site-specific communication network, and uploading the retrieved data to the stationary site using the site-specific communication network.

In another aspect, method for collecting data from machines lacking network connectivity may comprise receiving, at a mobile vehicle, a request for data, detecting a machine corresponding to the request, and providing, using the mobile vehicle, a first communication network to a data hauling device associated with the detected machine. The method may further include retrieving, using the mobile vehicle, data from the data hauling device via the first communication network, transporting the mobile vehicle to a location having a second communication network; and uploading, using the mobile vehicle, the retrieved data to a database at the location, via the second communication network.

In a further aspect, a method for initializing data collection from machines lacking network connectivity may include detecting an initial communication network, providing connectivity between a machine and a vehicle using the initial communication network, and performing certification of the machine and the vehicle using the initial communication network. The method may further include detecting, using the vehicle, the certified machine using a second communication network, collecting data from the certified machine via the second communication network, and uploading the data at a remote location.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus.

In this disclosure, relative terms, such as, for example, "about," substantially," "generally," and "approximately" are used to indicate a possible variation of ±10% in the stated value. Although the current disclosure is described with reference to a haul machine, this is only exemplary. In general, the current disclosure can be applied to any machine, such as, for example, any type of truck, loader, scraper, tractor, etc. While the current disclosure references exemplary placements of sensors, such sensors may be placed in other suitable locations consistent with the present disclosure.

Figure 1:
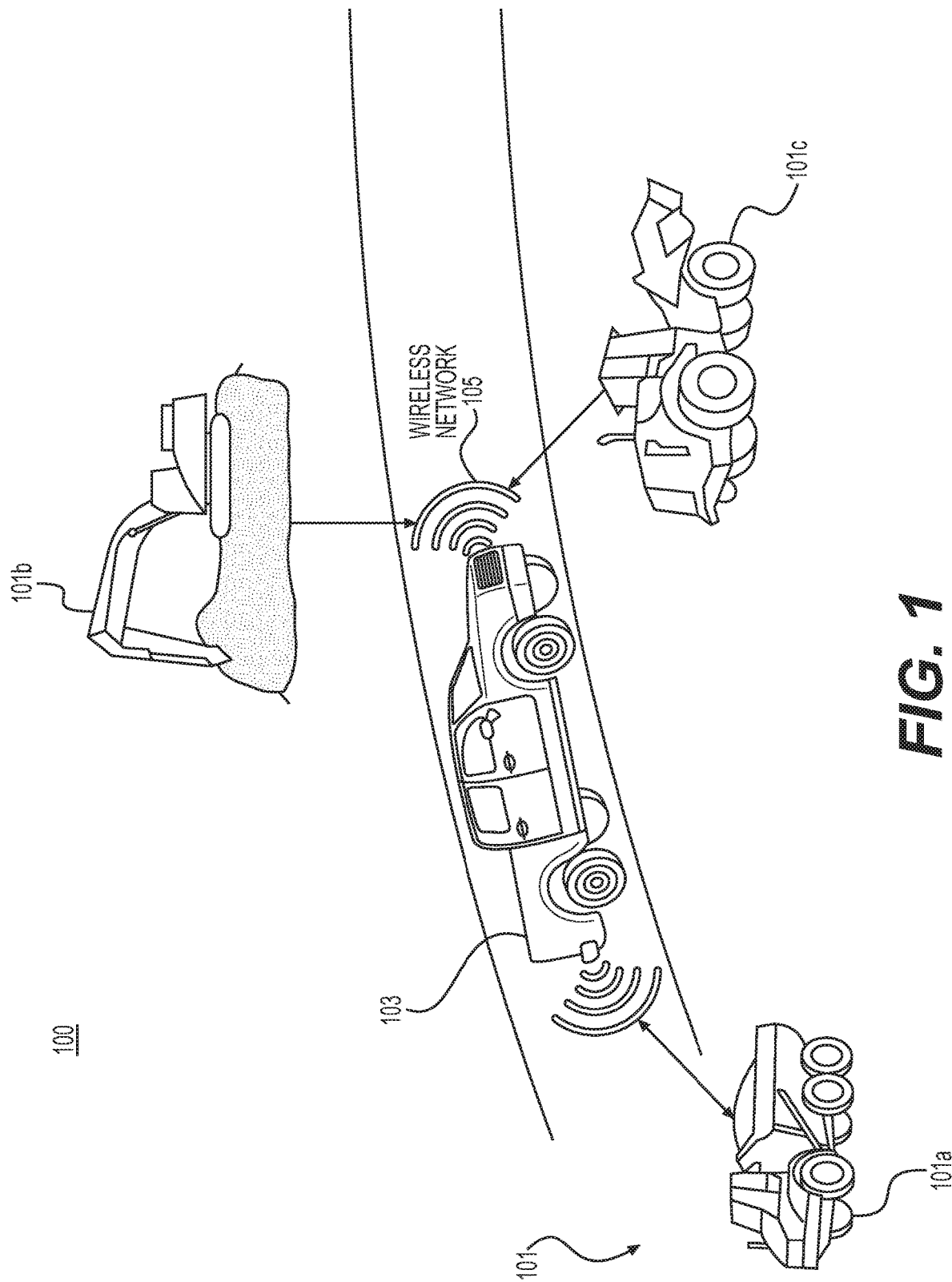
FIG. 1 is a schematic diagram of a system for providing network connectivity to discrete machines disconnected from a communication network, according to aspects of this disclosure.

FIG. 1 depicts an exemplary system 100 for providing network connectivity. System 100 may include one or more machines 101a-101c (collectively machines 101), a communication network-providing service vehicle 103, and a wireless network 105 providing connectivity to machines 101 near service vehicle 103. Machines 101 may be operating at a work location with limited or no communication network access, e.g., no cellular, satellite, wireless, Bluetooth®, radio, radio frequency, near-field communication, or data network (e.g., local area network (LAN), metropolitan area network (MAN), wide area network (WAN), the Internet, proprietary cable network, or fiber-optic network). The work location may refer to a construction/work site.

In one embodiment, each machine 101a, 101b, and 101c may include an engine control module (e.g., machine engine control module 201 of FIG. 2), which may collect machine data, e.g., data on machine diagnostics, performance, production, engineering, maintenance, location, operating hours, fuel levels or usage, operator activity, or a combination thereof. The data may be provided by various sensors on the machines 101. Data may be collected or sorted based on one or more information subscriptions associated with each machine 101a, 101b, and/or 101c. For example, engine control module 201 of machine 101a may include a telemetric system that records and stores various operational aspects of the machine 101.

Each machine 101a, 101b, and 101c may be equipped with a data hauling device, e.g., a data hauling radio. The data hauling radio may be configured to collect data associated with each machine's subscription or based on requests received by the machine. For example, the data hauling radio of machine 101a may be prompted by the engine control module of machine 101a to collect and store performance or status data of machine 101a. Further, the data hauling radio of machine 101a may be integrated with a telemetric system (and engine control system) of machine 101a. The data hauling radio of each machine may be a built-in radio, or a radio retrofitted onto the machine 101.

Service vehicle 103 may include any movable device or mobile vehicle, e.g., a truck, car, boat, aircraft, mobile phone, tablet, laptop computer, etc. The current embodiment describes service vehicle 103 as a truck, but any vehicle or device may be configured to perform the disclosed functions. In one embodiment, service vehicle 103 may receive a data request, e.g., a request for a status report on machine 101a. The request may be issued from a back office (not shown) via a back office network available at the back office site or proximate the back office location. The back office may be an office or central site whereas machines 101 may be at a remote work site.

In one embodiment, service vehicle 103 may drive to a location near machine 101a, provide wireless network 105 to machine 101a, and convey the request for a status report to machine 101a. For example, the request may be transmitted from service vehicle 103 to the control module and/or data hauling radio of machine 101a. The data hauling radio of machine 101a may then initiate collection and storage of status report data responding to the request. During this time, service vehicle 103 may stay at the work site of machine 101a or travel to other locations.

Service vehicle 103 may then return to machine 101a, provide a wireless network 105 to machine 101a, connect to the data hauling radio of machine 101a via wireless network 105, and download the collected status report data responding to the request. In other words, service vehicle 103 may transmit the request to machine 101a at a first point in time, and collect data responding to the request from machine 101 at a second, later point in time. After downloading the data from machine 101a, service vehicle 103 may return to the back office and upload the status report data to the back office records. In one embodiment, the service vehicle 103 may also provide a notification that the data responding to the request is available at the back office. The service vehicle 103 may further prompt generation of a report or assessment of machine operations based on the uploaded data. For example, the report may include metrics or analytics showing machine location, operator actions/efficiency, productivity, refueling or maintenance needs, operating status, etc.

Figure 2:
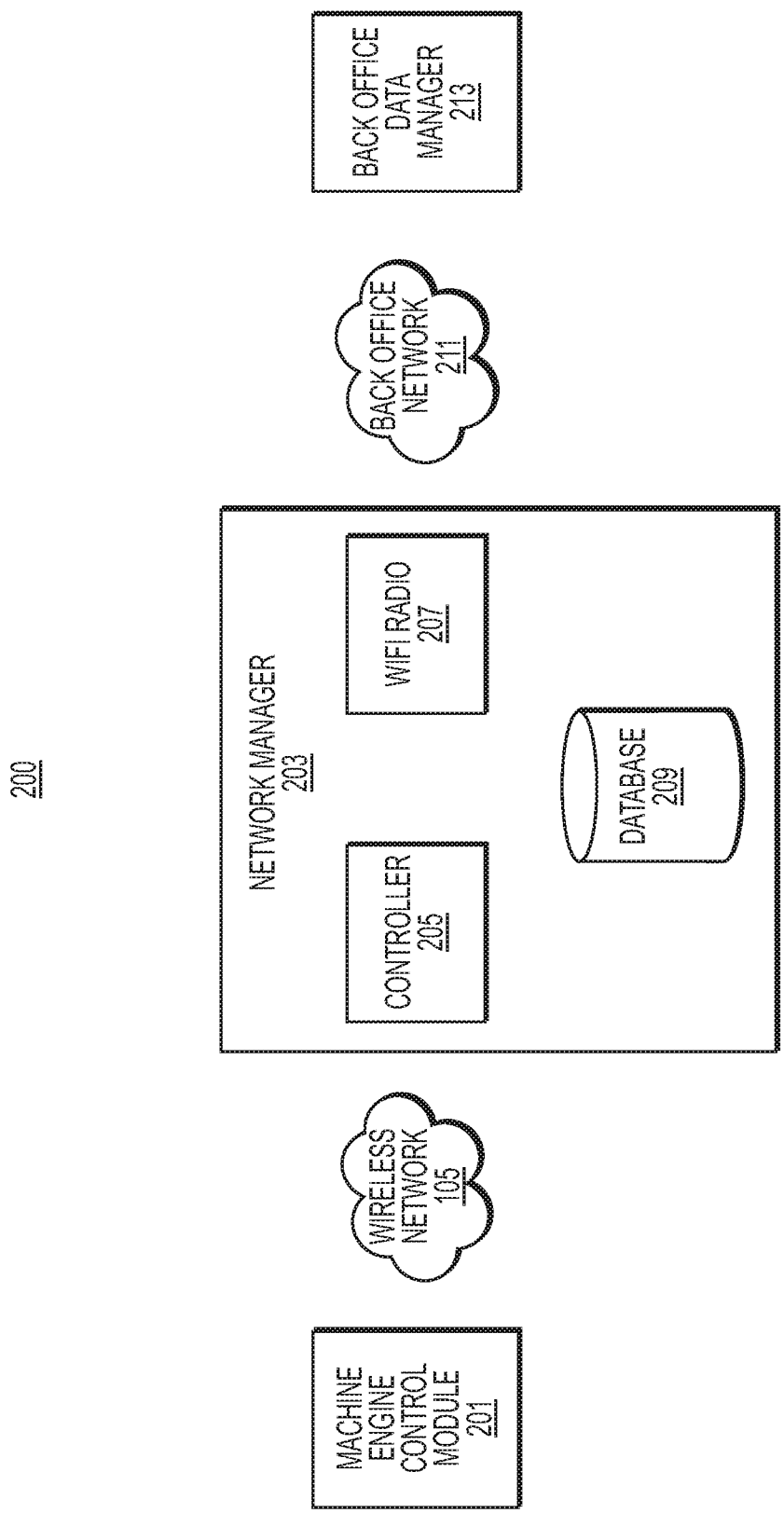
FIG. 2 is a block diagram of a data hauling system according to aspects of this disclosure.

FIG. 2 depicts a block diagram of an exemplary data hauling system 200. Data hauling system 200 may include exemplary processing components of the machines 101, service vehicle 103, and back office described above in connection with FIG. 1. Various components of the data hauling system 200 may include the machine engine control module 201, a wireless network 105, and network manager 203 to collect data, such as machine data. The data hauling system 200 may also include back office network 211 and back office data manager 213, which may issues data requests and receive final uploads of data collected for the requests.

Each machine of machines 101 may include an engine control module 201. To illustrate, the following embodiment describes engine control module 201 as the engine control module of machine 101a. Engine control module 201 may monitor various functions and statuses of machine 101a. Engine control module 201 may include and/or direct a data hauling radio of machine 101a to collect data on machine diagnostics, performance, production, engineering, maintenance, location, operating hours, fuel levels or usage, operator activity, or a combination thereof.

Network manager 203 may be installed on a movable device, e.g., service vehicle 103 of FIG. 1. For example, network manager 203 be installed on a vehicle/device equipped with WiFi that can act as a data "mule" for shuttling data between machines 101 and another party (e.g., a back office operator). In one embodiment, network manager 203 may comprise a mobile ubiquitous local area network (LAN) extension. Network manager 203 may include, for example, controller 205, WiFi radio 207, and database 209. Network manager 203 may detect machines 101 (e.g., via controller 205), download data from machines 101 (e.g., via WiFi radio 207), store the data (e.g., at database 209). Network manager 203 may also upload the data to a remote back office data manager 213 when the network manager 203 accesses the back office network 211. Data manager 213 may include an office or customer site having a storage entity (e.g., a database).

Controller 205 may initiate and provide a network connection to the data hauling radio of each machine of machines 101. Controller 205 may include one or more processors executing instructions contained in a memory of the network manager 203. Execution of the instructions may cause the controller 205 to direct the functions of the network manager 203 described herein. For example, controller 205 may prompt various capabilities of the network manager 203, including receipt of data requests, detection of authenticated/network enrolled machines 101, transmission of data requests, retrieval or receipt of data responsive to the requests, uploading of the retrieved data, and notification of a completed upload. Hard-wired circuitry may be used in place or in combination with software instructions to implement the disclosed embodiments.

WiFi radio 207 may include a long range radio, which may provision an area proximate the movable device to detect machines 101. In one embodiment, controller 205 may maintain a listing of machine service set identifiers (SSID) for machines 101 which may connect to the network provided by network manager 203. WiFi radio 207 may then provision the space surrounding the movable device for machines 101 having identifiers that match its listing.

Database 209 may store data collected from machines 101. Database 209 may comprise a memory, for example, a random access memory (RAM) or other dynamic storage device, a read-only memory or other static storage device. Alternately or in addition, database 209 may include a storage device, for instance, a magnetic disk or optical disk, a solid state drive (SSD), etc.

In one embodiment, once network manager 203 detects a machine (e.g., machine 101a), network manager 203 may provide wireless network 105 to the machine 101a and initiate a data transfer from machine 101a to network manager 203, over wireless network 105. The data transfer may include retrieval of data from the data hauling radio of machine 101a. The data may include subscription information comprising a product status report of machine 101a. A product status report may include measurements and/or or analytics on machine location, operator actions/efficiency, productivity, refueling or maintenance needs, operating status, or a combination thereof, related to machine 101a. In one embodiment, network manager 203 may generate a database log record for the data transfer and store the data transferred from machine 101a.

In one embodiment, network manager 203 may provide wireless network 105 only to machines that are approved through an enrollment process. In such a case, machines 101 may be "clients" of network manager. The previously-discussed listing of SSID maintained by controller 205 may be a listing of such clients. The enrollment process may include providing an enrollment pathway between a machine (e.g., machine 101a) and a vehicle (e.g., network manager 203 of service vehicle 103). The enrollment pathway between the machine and the vehicle may be configured to provide an initial certification for the machine to access the communication network. For example, the pathway may require and provide an initial certification comprising a security certification or authentication between the machine 101a and network manager 203. The enrollment pathway may be provided by an existing network, for example, a satellite connection. The satellite network may be unavailable when the network manager 203 and machines 101 connect after the enrollment process. Alternately, the satellite network may be available, but machines 101 and network manager 203 may refrain from connecting to the satellite network after enrollment, due to cost savings or heightened security in the connection provided just between network manager 203 and machines 101.

In one embodiment, wireless network 105 may include a WiFi connection provided by network manager 203 to machines 101, once machines 101 have undergone the enrollment process for the wireless network 105 of the network manager 203. Wireless network 105 and network manager 203 may maintain a secure gateway. Once the network manager 203 detects a certified machine of machines 101, the certified machine may connect to wireless network 105 through the gateway.

Network manager 203 may further interact with back office data manager 213 over a second network, e.g., back office network 211. Back office network 211 may be site-specific, in that back office network 211 may be available at the stationary site and location of the back office. Back office network 211 may be used when network manager 203 is in the vicinity of a back office, for instance, when the service vehicle 103 carrying network manager 203 departs or returns to the back office. Back office network 211 may include any communication network, including a cellular, WiFi, wireless, Bluetooth®, radio, radio frequency, near-field communication, data network, a local area network (LAN), metropolitan area network (MAN), wide area network (WAN), Internet, proprietary cable network, fiber-optic network, etc. Data manager 213 may include a back office or back office operator at a location remote from the location of machines 101. Back office network 211 may be unavailable or inaccessible to the machine(s) 101 (e.g., engine control module(s) 201) because the back office location may be remote or spaced from the location of the machine(s) 101.

In one embodiment, data manager 213 may provide or issue one or more requests for data, e.g., a request for a product status report from machine 101a. Network manager 203 may receive the request(s) for data while connected to the data manager 213 via back office network 211. In one embodiment, network manager 203 may certify to the back office/customer that it is able to complete the request. For example, network manager 203 receiving a request related to machine 101a may ensure that machine 101a has been enrolled. Network manager 203 may then notify data manager 213 that network manager 203 may complete the request.

Next, network manager 203 may collect data responding to the request(s). For example, if data manager 213 requested a product data status report of machine 101a, network manager 203 may be transported to a work site with machines 101, detect (via controller 205 and WiFi radio 207) the presence of machine 101a, and collect product data status report data from the data hauling radio of machine 101a. In particular, network manager 203 may undergo location changes until it detects the presence of machine 101a. Network manager 203 may then provide network connectivity (e.g., wireless network 105) to connect to the engine control module 201 and/or data hauling radio of machine 101a. Once the connection is established, network manager 203 may provide the request to engine control module 201, prompting engine control module 201 to collect and store data responding to the request, e.g., a product status report of machine 101a. Alternately or in addition if engine control module 201 has already stored data that may be responsive to the request, network manager 203 may download the stored data responsive to the request. Network manager 203 may generate a notification of data retrieval for either machine 101a or data manager 213. In one embodiment, the notification may include a database log record indicating retrieval of data from machine 101a, in accordance with the request from data manager 213.

After retrieving data from machine 101a, network manager 203 may upload the retrieved data to data manager 213. For example, network manager 203 may be transported to the back office location. Network manager 203 may then connect to data manager 213 via a cell or WiFi network of back office network 211. Once connected, network manager 203 may upload the product data status report of machine 101a, in response to the request from data manager 213. In one embodiment, a log of data retrieval by network manager 203 may be deleted once the retrieved data is uploaded to data manager 213. Network manager may further notify the back office requester of the uploaded product status report.

In summary, network manager 203 may be installed on a truck (e.g., service vehicle 103). Network manager 203 may receive data request from data manager 213 (e.g., while connected to data manager 213 via network 211). Network manager 203 may then be deployed to machines 101 at a site remote from data manager 213. For example, service vehicle 103 may drive network manager 203 to machines 101. Network manager 203/controller 205 may provision the vicinity of service vehicle 103 for machines 101 that correspond to data manager 213's request.

Once a corresponding machine 101 is detected by controller 205, network manager 203 may connect to corresponding machine 101 via wireless network 105 and transmit the request. Wireless network 105 may be provided only to machines that have gone through a prior network enrollment process. Controller 205 may manage a listing of machines 101 that are enrolled in wireless network 105 provided by network manager 203.

Once machine engine control module 201 of a corresponding machine 101 receives a request, machine engine control module 201 may prompt a data hauling radio of the corresponding machine 101 to collect and store data responding to the request. Network manager 203 may subsequently connect to machines 101 via network 105 and collect data from data hauling radios of the corresponding machine 101.

After collecting the data, network manager 203 may be transported to data manager 213 at a location remote from the site of machines 101. For example, service vehicle 103 may drive to the back office location of data manager 213. Network manager 203 and data manager 213 may then connect via a second network (e.g., back office network 211) and network manager 203 may upload the retrieved data to data manager 213 via network 211.

Figure 3:
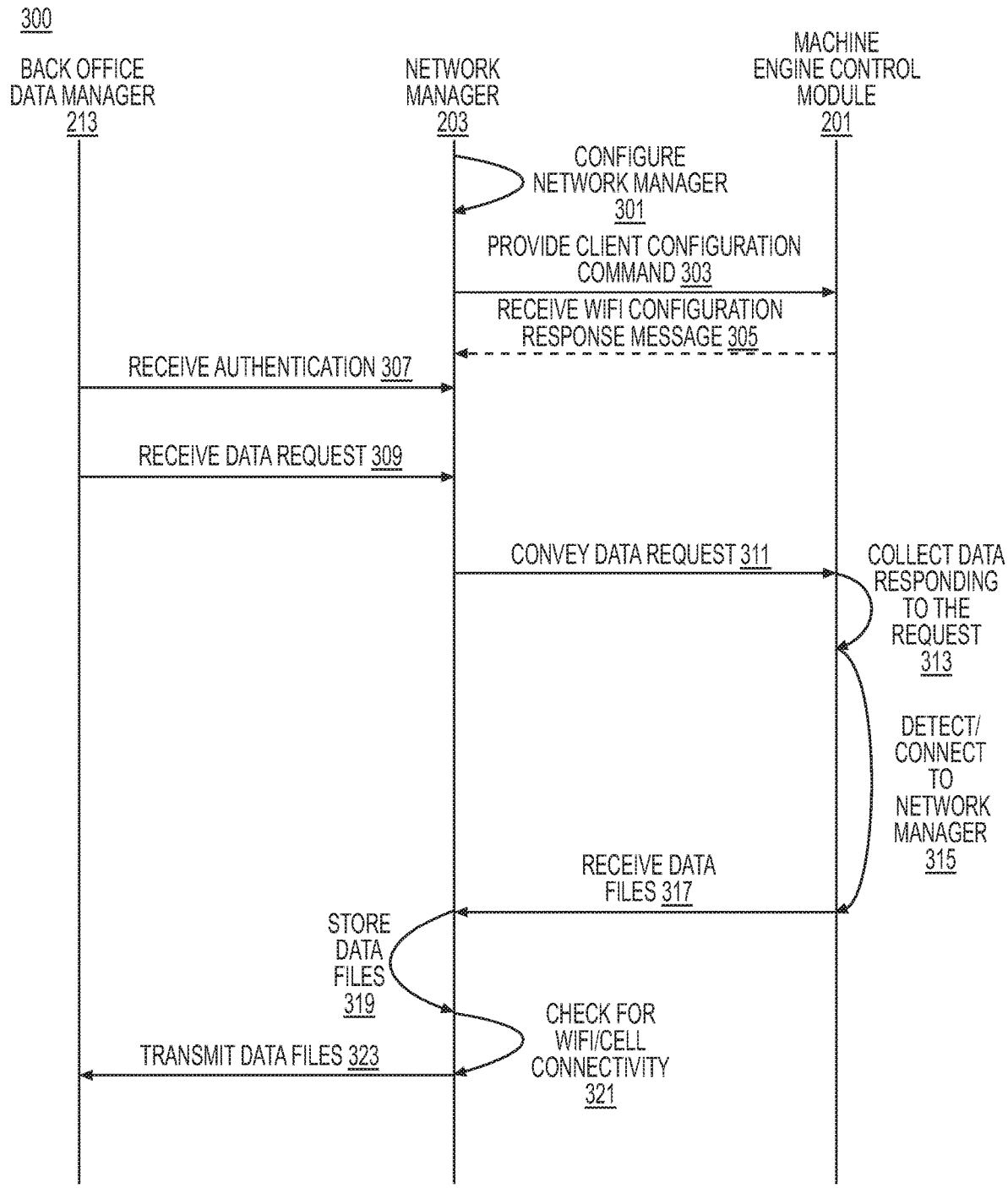
FIG. 3 is a flow diagram showing an exemplary initiation and use of the system providing network connectivity according to aspects of this disclosure.

FIG. 3 depicts an exemplary method 300 for receiving product status data from machines disconnected from a network (e.g., without radio, wireless, cellular, data, or LAN connection(s)). In one embodiment, step 301 may include network manager 203 being configured to provide connectivity to machines 101. Step 303 may include network manager 203 providing a configuration command to engine control module 201 (of a machine 101) to initiate exchanges between the engine control module 201 and network manager 203. Step 305 may include network manager 203 receiving a (WiFi) configuration response message from engine control module 201. Once initiation is completed between network manager 203 and machines 101, network manager may travel to the back office to obtain requests that it may relay to the machines 101. For example, network manager 203 may also receive an authentication message from a customer (e.g., back office data manager 213) to verify that network manager 203 may interact with machines 101 of the customer. Once network manager 203 is authenticated (step 307), network manager 203 may receive a request message provided by the customer (step 309). Network manager 203 may travel back to machines 101 to convey the request to each engine control module 201, which may begin to store or retrieve data responding to the request (steps 311 and 313). Once connectivity between network manager 203 and engine control module 201 is detected and established (step 315), network manager 203 may receive and store data files from engine control module 201 (steps 317 and 319). Network manager 203 may then check for WiFi or cell connectivity with the customer (step 321) and upload the received data files to the client (step 323).

INDUSTRIAL APPLICABILITY

Machines often track and store data, including, e.g., location, operator actions/efficiency, productivity, refueling or maintenance needs, operating status, etc. Such data may be used by a machine owner or user to assess, track, manage, and optimize individual machine performance or fleet operations. Without the data, machine owners and users at back offices or stationary offices may not have the quantitative information to evaluate the performance of their machines. Currently, data stored on machines operating at sites remote from back office(s) may be collected via cellular networks or satellite networks. Mobile hotspots may also create wireless access points by accessing cellular data connections. However, some work sites lack cellular networks and data services provided by satellite networks may be expensive. Alternately, data from machines may be manually collected, e.g., by connecting a Universal Serial Bus (USB) or external hard drive to a machine. This solution may present security concerns. Since machine data may be confidential, manual collection of data may involve permitting only certain users/technicians who have selected security clearances or certifications to access and download the machine data.

Unlike systems which rely on cellular or satellite networks, the disclosed aspects of the system 100 and service vehicle 103 described herein may be used to collect data from machines in settings where communication network connectivity is unavailable, unreliable, lacking security safeguards, or expensive. In contrast to manual data collection methods, the disclosed aspects of service vehicle 103 may not require additional security protocols. Since disclosed service vehicle 103 may provide a way for data to be securely and automatically collected, any human driver or automated driver may drive service vehicle 103 to a work site and collect data. Because the service vehicle 103 automatically collects data without the driver accessing the data, the disclosed embodiments do not require the driver to have security certifications. In this way, the disclosed aspects of service vehicle 103 enhance the ease of data collection from remote machines. Further, one embodiment of the disclosed network manager 203 may provide a wireless network only when an enrolled or certified machine is detected. The lack of constant connection ensures a secure data storage environment, as the service vehicle physically travels from the work site to the back office/stationary site to transmit collected machine data to the back office.

It will be apparent to those skilled in the art that various modifications and variations can be made to the disclosed system without departing from the scope of the disclosure. Other embodiments of the system will be apparent to those skilled in the art from consideration of the specification and practice of the machine disclosed herein. It is intended that the specification and examples be considered as exemplary only, with a true scope of the disclosure being indicated by the following claims and their equivalents.

What is claimed is:

1. A system for collecting data from a machine lacking network connectivity, the system comprising:
   a mobile vehicle configured for:
      providing a vehicle communication network to a data hauling device of the machine, the machine being remote from a stationary site having a site-specific communication network;
      retrieving data from the data hauling device via the vehicle communication network;
      detecting the site-specific communication network; and
      uploading the retrieved data to the stationary site using the site-specific communication network; and
   an enrollment pathway between the machine and the mobile vehicle, the pathway configured to provide an initial certification for the machine to access the vehicle communication network.

2. The system of claim 1, wherein the vehicle communication network comprises a wireless network and wherein the site-specific communication network comprises a cellular, WiFi, wireless, Bluetooth®, radio, radio frequency, near-field communication, data network, local area network (LAN), metropolitan area network (MAN), wide area network (WAN), Internet, proprietary cable network, or fiber-optic network.

3. The system of claim 1, wherein the retrieved data comprises measurements or analytics relating to machine location, operator actions or efficiency, productivity, refueling or maintenance needs, operating status, or a combination thereof.

4. The system of claim 1, wherein the mobile vehicle comprises a truck, car, boat, aircraft, mobile phone, tablet, or laptop computer.

5. The system of claim 1, wherein the mobile vehicle is further configured for generating a notification of data retrieval.

6. The system of claim 1, wherein the initial certification comprises a security authentication for the data hauling device to access the vehicle communication network.

7. The system of claim 1, wherein the mobile vehicle is further configured for detecting the machine.

8. The system of claim 1, wherein the retrieved data corresponds to data stored by the data hauling device of the machine, in response to a request from a back-office operator of the stationary site.

9. A method for collecting data from machines lacking network connectivity, comprising:
   receiving, at a mobile vehicle, a request for data;
   detecting a machine corresponding to the request;
   providing, using the mobile vehicle, a first communication network to a data hauling device associated with the detected machine;
   retrieving, using the mobile vehicle, data from the data hauling device via the first communication network;
   transporting the mobile vehicle to a location having a second communication network;
   uploading, using the mobile vehicle, the retrieved data to a database at the location, via the second communication network;
   transmitting, using the first communication network, the request to the detected machine at a first point in time; and
   retrieving, using the first communication network, the data from the data hauling device at a second point in time subsequent to the first point in time.

10. The method of claim 9, where the detected machine lacks access to the second communication network.

11. The method of claim 9, wherein the retrieved data corresponds to data stored by the data hauling device, in response to a request from a back-office operator.

12. The method of claim 10, further comprising:
   initializing a connection to the machine using an enrollment pathway; and
   providing the first communication network only once initialization is complete.

13. The method of claim 12, wherein the enrollment pathway comprises a satellite connection.

14. The method of claim 12, wherein the enrollment pathway is unavailable when the machine is detected.

15. The method of claim 9, wherein the first communication network comprises a wireless network.

* * * * *